B. Morahan,
Ice Pitcher
No. 93,734.
2 Sheets, Sheet 1.
Patented Aug. 17, 1869.

WITNESSES.
G. Stackpole
H. C. Covert

INVENTOR.
Bernard Morahan

B. Morahan,
Ice Pitcher.
No. 93,734. Patented Aug. 17, 1869.

United States Patent Office.

BERNARD MORAHAN, OF BROOKLYN, NEW YORK.

Letters Patent No. 93,734, dated August 17, 1869.

IMPROVED ICE-PITCHER.

The Schedule referred to in these Letters Patent and making part of the same.

*To all whom it may concern:*

Be it known that I, BERNARD MORAHAN, of the city of Brooklyn, county of Kings, and State of New York, have invented a new and useful Improvement in Ice-Pitchers; and I do hereby declare that the following is a full and exact description thereof, reference being had to the accompanying drawings, and to the letters of reference marked thereon.

The nature of my invention consists in providing the lip or spout of a pitcher with a covering, the edge of which projects inwardly, for the purpose of arresting the ice, and preventing it from leaving the pitcher while water is being poured therefrom.

The object of my invention is to furnish a cheap, simple, and effective means for keeping the ice in a pitcher while water is being poured therefrom, without the application of a lid or cover. It is particularly designed for an ice-pitcher, but will also be very useful for lemonade, and in many other cases where it is desired to prevent too large or bulky pieces of whatever substance may be used from passing out on the spout of the pitcher while its liquid is being poured.

To enable others skilled in the art to make and use my invention, I will proceed to describe its construction and operation, reference being had to the accompanying drawings, and to the letters of reference marked thereon, which form a part of this specification.

I construct my pitcher of crockery-ware, stone-ware, china, metal, or any other suitable substance.

In the accompanying drawings—

Figure 1:
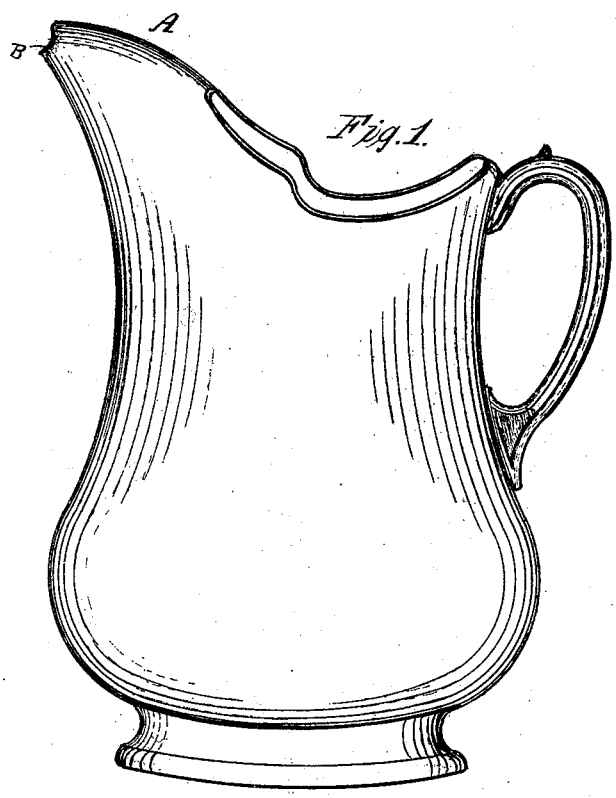
Figure 1 is a side elevation with my improvement attached.
Figure 2:
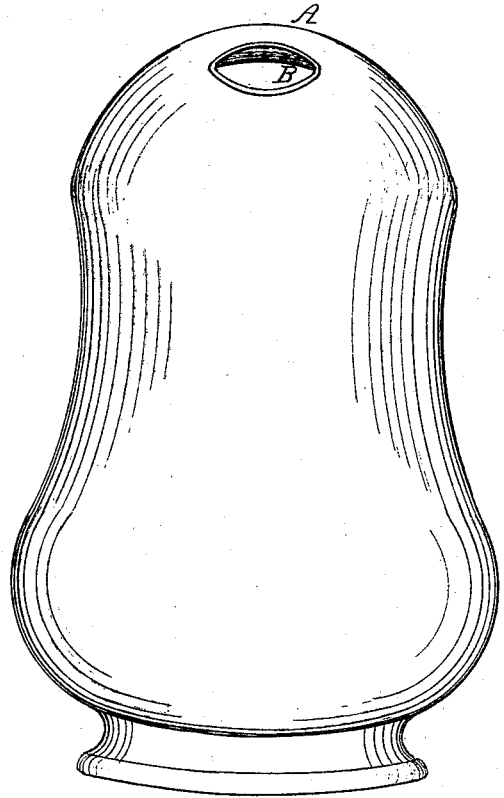
Figure 2 is a front elevation with my improvement attached.

Letter A is the covering of the lip or spout, or rather the guard, which is for the purpose of arresting the ice, and preventing it from leaving the pitcher while water is being poured therefrom.

Letter B is the mouth or opening through which the water is poured.

In all ice-pitchers previously constructed, a movable lid has been the only device used for preventing the ice from escaping from the pitcher while the water is being poured therefrom. Such pitchers have a hole through the cover, to allow the water to escape, or have perforations through the walls of the pitcher, for said purpose, opposite the spout, but the movable covers have in all cases had to serve the purpose of keeping the ice back.

Now, my object is to furnish a guard, which shall partially cover the top of an ice-pitcher, said guard being an integral part of said pitcher, so as to dispense with a movable cover, and furnish a more convenient pitcher for hotels, restaurants, saloons, &c.

I do not claim an ice-pitcher having double walls and double bottom; nor do I claim a hinged lid or cover, nor a chain or string connecting the handle with the lid or cover of an ice-pitcher, as claimed by James Stimpson in his specification, dated October 17, 1854; neither do I claim as new, a pitcher having a covered spout, as I am aware that such pitchers have been made and used; nor do I claim a drinking-cup having a guard for preventing the moustache from coming in contact with the liquid; but What I do claim as new, and desire to secure by Letters Patent, is—

An ice-pitcher, having a covering or guard covering a portion of the nose or spout of the same, the inner edge of which extends inwardly beyond the inner walls of the pitcher when said covering or guard is an integral part of the pitcher, substantially as and for the purpose set forth.

BERNARD MORAHAN.

Witnesses:
G. STACKPOLE,
H. C. COVERT.